United States Patent [19]

Dubé

[11] Patent Number: 5,853,798
[45] Date of Patent: Dec. 29, 1998

[54] PROCESS FOR FORMATION OF AN ELECTRODE ON AN ANION EXCHANGE MEMBRANE

[75] Inventor: James R. Dubé, Boston, Mass.

[73] Assignee: United Technologies Corporation, Hartford, Conn.

[21] Appl. No.: 928,169

[22] Filed: Sep. 12, 1997

[51] Int. Cl.$^6$ .............................. B05D 3/10; B05D 5/12
[52] U.S. Cl. ........................................... 427/125; 427/343
[58] Field of Search ................................. 427/125, 115, 427/343, 333

[56] References Cited

U.S. PATENT DOCUMENTS

| | | | |
|---|---|---|---|
| 3,351,487 | 11/1967 | Levine et al. | 427/125 |
| 3,630,768 | 12/1971 | Bianchi et al. | 427/229 |
| 3,635,758 | 1/1972 | Schneble, Jr. et al. | 427/98 |
| 5,190,813 | 3/1993 | Ohashi et al. | 427/337 |
| 5,374,454 | 12/1994 | Bickford et al. | 427/282 |
| 5,800,938 | 9/1998 | Watanabe | 429/30 |

OTHER PUBLICATIONS

P. Millet, et al., "New Solid Polymer Electrolyt Composites for Water Electrolysis", 19 Journal of Applied Electrochemistry, 162–166 (1989), no month.

A. Katayama–Armata, et al., "Metal Electrodes Bonded on Solid Polymer Electrolyte Membranes (SPE)", vol. 18, No. 6, Electrochemica Acta, 777–780 (1983) (No month).

*Primary Examiner*—Diana Dudash
*Attorney, Agent, or Firm*—Malcolm J. Chisholm, Jr.

[57] ABSTRACT

The invention is a process for formation of an electrode on a solid polymer anion exchange membrane to increase rates of reaction at a reaction surface of the membrane. The process includes the steps of soaking a polymer anion exchange membrane in a solution containing an anionic entity wherein a desired metal catalyst is contained within the anionic entity so that anions containing the metal catalyst exchange into the membrane by electrostatic attraction, and exposing the membrane to a reducing agent so the metal catalyst is reduced to a metallic form to become physically secured at a reaction surface of the membrane to thereby form the electrode adjacent the reaction surface. In preparation of an electrode on an anion exchange membrane, the process is concluded by rinsing the membrane in distilled water and then the membrane is cycled through the soaking, exposing and rinsing steps until a desired level of catalyst loading is achieved. In a first preferred process, the polymer anion exchange membrane is a tetraflouroethelyene-flourinated ethylene propylene ("TFE-FEP") based membrane; the anionic entity is chloroplatinic acid; and the reducing agent is sodium borohydride. In a second preferred process, the polymer anion exchange membrane is a polyolefin based membrane; the anionic entity is potassium tetrachloroplatinate; and the reducing agent is sodium borohydride.

4 Claims, No Drawings

PROCESS FOR FORMATION OF AN ELECTRODE ON AN ANION EXCHANGE MEMBRANE

TECHNICAL FIELD

The present invention relates to electrochemical cells that utilize solid polymer membrane electrolytes, and especially relates to a process for forming a catalyst electrode on a surface of a solid polymer membrane.

BACKGROUND OF THE INVENTION

Electrochemical cells are commonly used for producing product gases from a supply fluid such as water, and may be also used in "fuel cell" configurations to produce electrical energy from supply fuels. In a well-known application, electrochemical cells are utilized to electrolyze water into oxygen and hydrogen gases, and such cells may include planar shaped solid polymer electrolyte membranes between cathode and anode chambers to facilitate transport of hydrogen ions between the chambers. Upon application of an electrical potential to the electrolyte membrane, positively charged hydrogen ions (cations) are attracted to negatively charged electrons at a reaction surface of the solid polymer ion exchange membrane where the hydrogen cations combine with the electrons to form hydrogen gas.

In such a common electrochemical cell, the solid polymer electrolyte membrane is characterized as a cation exchange membrane because it facilitates transport of positively charged cations across the membrane. To enhance electrical conductivity and increase rates of ion exchange across the membrane, metal catalysts are formed into an electrode and positioned at reaction surfaces of such ion exchange membranes. A variety of methods have been developed to bond such electrodes to surfaces of solid polymer electrolyte membranes. For example, U.S. Pat. No. 5,470,448 to Molter et al., incorporated herein by reference and assigned to the assignee of the present invention, shows a process for forming a metal catalyst ionomer layer bonded to a reaction surface of a cation exchange membrane, wherein the membrane is a perfluoroionomer acid membrane that is well-known in the art, such as membranes sold by E.I. DuPont De Nemours, Inc. of Willmington, Del. under the trademark designation NAFION® 117 membrane. The process disclosed in Molter et al. includes heating an aqueous solution of swollen ionomer solids and a metal catalyst until a dry powder remains; forming a solid paste of the dry powder and a fast drying agent or subliming agent; pressing the solid paste onto the reaction surface of the cation exchange membrane within a specific temperature and pressure range; and rehydrating the exchange membrane and bonded ionomer solids of the solid paste to form the metal catalyst ionomer layer (which layer is referred to herein as an electrode). That process utilizes a mixture of iridium and platinum metals as the catalyst, and can achieve catalyst loadings in such an electrode of at least 0.10 milligrams (mg.)/square centimeter ($cm^2$).

Applications of polymeric ion exchange membranes in electrochemical cells other than water electrolysis cells however has generated new fabrication demands for formation of metal catalyst electrodes on such membranes. For example, in applications wherein electrochemical cells are utilized for electrodialytic salt-splitting to generate chlorine gas, or hydrochloric acid and caustic soda etc.; for treating waste water from gas scrubber treatment systems; or for revitalizing air in a closed-environment structure such as a submarine or space craft, the cells require both cation and anion exchange membranes. Known anion exchange membranes that contain quartenary ammonium functional groups are appropriate for such roles, but are limited to relatively low temperature applications of below 130 degrees fahrenheit (°F.). Consequently, known processes that include heating to bond a binder and catalyst to form an electrode at a reaction surface of known cation exchange membranes are inappropriate for formation of metal catalyst loaded electrode surfaces on a polymeric anion exchange membrane.

Electrode formation on cation exchange perfluoroionomer acid membranes has also been achieved through electroless deposition of a positively charged ion from a dissolved precursor salt onto a reaction surface of a cation exchange membrane, followed by exposure of the surface to a reducing agent. Because known anion exchange membranes have different chemical properties than cation membranes, and because common cationic precursor salts and related compounds appropriate for electroless deposition of desired catalysts on cation exchange membranes are inappropriate for deposition of catalysts onto anion membranes, known electroless deposition processes for formation of electrodes on cation exchange membranes cannot be applied to anion exchange membranes. Therefore, an electroless process is needed for formation of a metal catalyst loaded electrode on an anion exchange membrane.

Accordingly, it is the general object of the present invention to provide a process for formation of an electrode on an anion exchange membrane that overcomes the deficiencies of the prior art.

It is a more specific object of the present invention to provide a process for formation of an electrode on an anion exchange membrane that can be implemented with known compounds and materials.

It is yet another object of the present invention to provide a process for formation of an electrode on an anion exchange membrane that achieves desired levels of catalyst loading within the electrode.

It is a further object of the present invention to provide a process for formation of an electrode on an anion exchange membrane that results in an electrode securely bonded to a reaction surface of the membrane.

SUMMARY OF THE INVENTION

A process for formation of an electrode on a polymer anion exchange membrane is disclosed to increase rates of reaction at reaction surfaces of the membrane. The process includes the steps of soaking a polymer anion exchange membrane in a solution containing an anionic entity wherein a desired metal catalyst is contained within the anionic entity so that anions containing the metal catalyst exchange into the membrane by electrostatic attraction, and exposing the membrane to a reducing agent so the metal catalyst is reduced to a metallic form to become physically secured at a reaction surface of the membrane to thereby form the electrode adjacent the reaction surface. In a first preferred process, the polymer anion exchange membrane is based on a tetraflouroethelyene-flourinated ethylene propylene ("TFE-FEP") backbone; the anionic entity is chloroplatinic acid; and the reducing agent is sodium borohydride. In a second preferred process, the polymer anion exchange membrane has a polyolefin membrane backbone; the anionic entity is potassium tetrachloroplatinate; and the reducing agent is sodium borohydride. In preparation of an electrode on an anion exchange membrane, the process is concluded by rinsing the membrane in distilled water and then the membrane is cycled through the soaking, exposing and rinsing steps until a desired level of catalyst loading is achieved.

DETAILED DESCRIPTION TO THE INVENTION

The process of the present invention may be applied to any planar shaped polymer membrane capable of transporting anions, many of which are well-known in the art. For example, one type of appropriate anion exchange membranes are made by radiation grafting ionic groups to a tetraflouroethelyene-flourinated ethylene propylene ("TFE-FEP") membranes such as those sold under the product designation "RAI R4030 membrane", manufactured by Pall RAI, Inc., of Hauppauge, N.Y., U.S.A. Other acceptable anion exchange membranes are well-known polyolefin membranes, such as those sold under the product designation "Tokuyama Soda AMH membrane", manufactured by Tokuyama Soda Co. Ltd., of Tokuyama City, Japan.

Experiments have established that use of specific anionic entities of metal catalysts achieve optimal results under specific application procedures, but the invention includes application of anionic entities of any metals capable of increasing rates of reaction at a reaction surface of an anion transporting polymeric membrane. Those metals include platinum, iridium, ruthenium, palladium and any other metal that can be reduced in-situ by sodium borohydride or other reducing agents. Preferred anionic entities for the introduction of platinum metal into an anionic exchange membrane include chloroplatanic acid ($H_2[PtCl_4]$) and potassium tetrachloroplatinate ($K_2[PtCl_4]$). Appropriate anionic entities for introduction of other metals listed herein include salts well-know in the art that contain the metal in an anionic form.

Any reducing agent that is both capable of converting an anion of a metal catalyst to its metal form and that also compatible with a polymer anion exchange membrane is appropriate. Experiments have established that sodium borohydride ($NaBH_4$) achieves optimal results. However, other acceptable reducing agents include hydrogen gas and various well-know organic reducing agents such as formaldehyde. The strength of a reducing agent being used depends upon the specific metal being used, in a well-known manner.

WORKING EXAMPLES

In the following description of working examples of the present invention, well-known, commonly available polymer anion exchange membranes, anionic entities and reducing agents were utilized.

Example A

A RAI R4030 tetraflouroethelyene-flourinated ethylene propylene membrane cut to a size of approximately a 15 centimeter ("cm") by 15 cm square was soaked in 0.1 molar solution of (hereafter "M") sodium hydroxide (NaOH) at room temperature for one hour to exchange the membrane to a hydroxide ion form. It was then rinsed in distilled water and soaked in a 0.02M chloroplatinic acid ($H_2[PtCl_4]$) for one hour at room temperature. A reaction surface of the membrane turned orange as it exchanged platinum ions. The membrane was then rinsed in distilled water and soaked for one hour in 1.0M sodium borohydride ($NaBH_4$) at room temperature and evolved hydrogen and turned black and silver as the platinum was reduced. The membrane was then cycled two times sequentially through the steps of rinsing in distilled water; soaking in the 0.02M chloroplatanic acid ($H_2[PtCl_4]$) for one hour at room temperature; rinsing with distilled water; and soaking in a 0.02M chloroplatanic acid ($H_2[PtCl_4]$) for one hour at room temperature to increase the platinum loading of the electrode to a desired level. The resulting membrane exhibited a platinum loading of about 1.6 milligrams of platinum per square centimeter ($Pt/cm^2$). Electron microscope examination of the resulting membrane established that the almost all of the platinum remained adjacent the reaction surface of the membrane and did not penetrate into the membrane.

Example B

A Tokuyama Soda AMH polyolefin membrane was secured within a rectangular box shaped frame of a LEXAN® plastic wherein the frame had a window that defined an area of the reaction surface of the membrane for formation of an electrode, and the frame defined bath inlets adjacent a second surface of the membrane opposed to the reaction surface. (A membrane secured as described above will hereafter be referred to for convenience as a "framed membrane".) The framed membrane is appropriate for formation of an electrode having specific dimensions at a reaction surface of the membrane, as opposed to formation of an electrode over an entire membrane. The window of the frame defines dimensions of the electrode.

The framed membrane was placed in a bath of 1.0M sodium borohydride ($NaBH_4$) at room temperature wherein only the second surface of the membrane was exposed to the bath of sodium borohydride through the bath inlets and the reaction surface of the membrane within the window was not directly exposed to the bath, and the reaction surface of the membrane defined within the window was covered with 0.02M potassium tetrachloroplatinate ($K_2[PtCl_4]$) for one hour at room temperature. Then the framed membrane was rinsed with distilled water. The membrane defined within the window turned black and silver as platinum deposited out of solution. The borohydride was absorbed into the membrane and migrated to the reaction surface within the window to reduce the platinum ion to platinum metal.

The framed membrane was then cycled six times through the steps of exposing the second surface of the membrane to the sodium borohydride and covering the reaction surface of the membrane defined within the window with potassium tetrachloroplatinite for one hour at room temperature and then rinsing with distilled water in order to increase the platinum loading of the electrode to a desired level. The resulting electrode defined on the reaction surface of the membrane within the window appeared as a silver layer and exhibited a platinum loading of 3.9 $mg/cm^2$.

Use of solid polymer membrane electrolytes prepared according to the processes of both Example A and Example B has demonstrated very satisfactory performance in electrodialytic-type electrochemical cells used for salt splitting. In splitting an alkaline salt with a divalent anion, a cell using an electrode produced according to the process of Example A performed at approximately twenty per cent lower voltage than a cell using an electrode produced according to the process of Example B when operated at 100 amperes per square foot, while at higher current levels, performance of the cells using Example A and Example B electrodes was nearly equal.

While the present invention has been described with respect to particular working examples, it will be understood by those skilled in the art that the present invention is not limited to those examples. Accordingly, reference should be made primarily to the attached claims rather that the foregoing specification to determine the scope of the invention.

What is claimed is:

1. A process for formation of an electrode on an anion exchange membrane, comprising the steps of:

a. soaking a polymer anion exchange membrane in a solution containing a metal catalyst wherein said metal catalyst is selected from the group consisting of chloroplatanic acid and potassium tetrachloroplatinate, so that anions of the metal catalyst exchange into the membrane; and b. exposing the membrane to a reducing agent that reduces the anions of the metal catalyst to a metallic form at a reaction surface of the membrane to thereby form the electrode adjacent the reaction surface.

2. The process of claim 1, wherein the step of soaking further comprises soaking a polyolefin membrane in the solution of a metal catalyst.

3. A process for formation of an electrode on an anion exchange membrane, comprising the steps of:

a. soaking a polymer anion exchange membrane in a solution containing an anionic entity consisting of a metal catalyst wherein said metal catalyst is selected from the group consisting of platinum, iridium, ruthenium and palladium, so that anions of the metal catalyst exchange into the membrane; and b. exposing the membrane to a reducing agent that reduces the anions of the metal catalyst to a metallic form at a reaction surface of the membrane to thereby form the electrode adjacent the reaction surface.

4. A process for formation of an electrode on an anion exchange membrane, comprising the steps of:

a. soaking a polymer anion exchange membrane in a solution containing an anionic entity consisting of a metal catalyst wherein said metal catalyst is selected from the group consisting of metals capable of increasing rates of reaction at a reaction surface of the polymer anion exchange membrane, so that anions of the metal catalyst exchange into the membrane; and b. exposing the membrane to a reducing agent that reduces the anions of the metal catalyst to a metallic form at the reaction surface of the membrane to thereby form the electrode adjacent the reaction surface.

* * * * *